C. R. GREUTER.
ENGINE VALVE MECHANISM.
APPLICATION FILED AUG. 22, 1918.

1,350,800.

Patented Aug. 24, 1920.
4 SHEETS—SHEET 1.

Fig. 1.

Inventor:
Charles R. Greuter,
By Dodge & Sons,
Attorneys

C. R. GREUTER.
ENGINE VALVE MECHANISM.
APPLICATION FILED AUG. 22, 1918.

1,350,800.

Patented Aug. 24, 1920.
4 SHEETS—SHEET 3.

Inventor:
Charles R. Greuter,
By
Attorney

C. R. GREUTER.
ENGINE VALVE MECHANISM.
APPLICATION FILED AUG. 22, 1918.

1,350,800.

Patented Aug. 24, 1920.
4 SHEETS—SHEET 4.

Inventor:
Charles R. Greuter,
By Dodge Sons,
Attorneys.

UNITED STATES PATENT OFFICE.

CHARLES R. GREUTER, OF DETROIT, MICHIGAN.

ENGINE-VALVE MECHANISM.

1,350,800.  Specification of Letters Patent.  Patented Aug. 24, 1920.

Application filed August 22, 1918. Serial No. 250,995.

*To all whom it may concern:*

Be it known that I, CHARLES R. GREUTER, a citizen of the United States, residing at Detroit, in the county of Wayne and State of Michigan, have invented certain new and useful Improvements in Engine - Valve Mechanisms, of which the following is a specification.

This invention relates to that class of internal combustion engine valves in which the inlet and exhaust valves are concentrically arranged, and are moved both independently and in unison to open and to close the inlet and the exhaust ports.

The invention consists in novel features of construction of the valves proper, and also and more particularly, in means for opening and closing both valves positively and in proper sequence and timing.

As is well known, internal combustion engines develop their greatest efficiency when running at high speeds; but owing to inertia of parts and to other causes, it is difficult to insure full and proper movement of the valves in both directions when running at such speeds. In an endeavor to attain this important end it has been the more general practice to provide cams for opening the valves, either directly or through intermediate devices, and to effect their closing by means of springs. This plan which is probably more satisfactory than others heretofore resorted to, is objectionable for the reason that when the cams turn over with great frequency or rapidity they overthrow the valves, which are hence found to be sluggish in seating or returning. In fact, at extremely high speeds they apparently at times do not seat at all, but only partially close the inlets, and cause a chattering or hammering that is destructive both of the cams and of the valves. If the springs be made strong or stiff to insure quicker and better seating action, they offer an undue resistance and require too great expenditure of power to open the valves.

For aviation work particularly, it is essential to attain maximum power and speed in proportion to weight, and to preclude the possibility of failure of a valve to seat and unseat fully every time. It is in this field of work that engines are run at maximum attainable speeds, the cam shaft often making several thousand revolutions per minute. Constant and efficient lubrication is also essential, and the parts should function perfectly in all positions of the engine.

To insure full and unvarying opening and closing of the valves at all times and under all conditions of use, I provide means for effecting both operations positively, and for maintaining constant contact of the actuating cams with the surfaces against which they act, so that the valves shall always move the full predetermined distance and no more. In this way maximum efficiency is secured, and hammering or chattering and consequent wear, are prevented.

Proper lubrication is insured by special means, which will be described.

Concentric valves are employed for the reason that they afford greater area for inlet and exhaust ports or openings than any other type or form of valve practicable under conditions of use, while at the same time being comparatively easy to fit and to maintain in perfect seating condition.

The invention is, as indicated, directed to positively-acting mechanism for actuating valves of this type in proper time and sequence at all speeds, a result not hitherto attained so far as I am aware. Practical and thorough tests of the mechanism now to be described show a marked increase in efficiency, due to proper development of these features.

The accompanying drawings illustrate a preferred embodiment of the invention, which, however, is susceptible of modification in various of its details. In these drawings.

Figure 1:
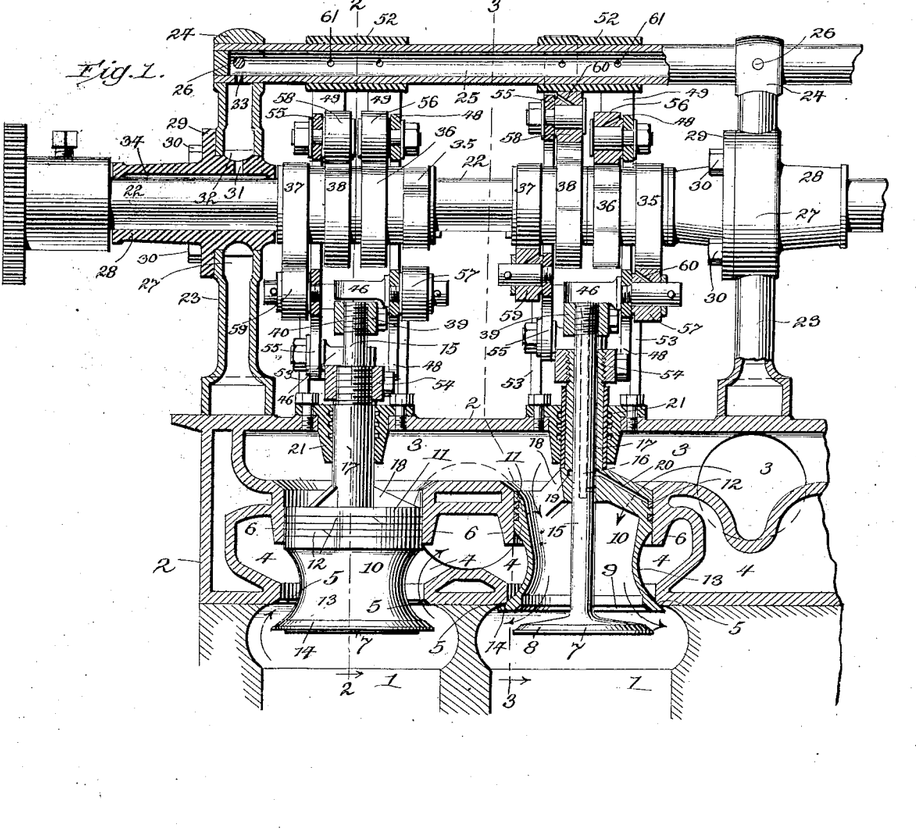
Figure 1 is a sectional elevation of the improved structure, applied to two cylinders of an internal combustion engine.
Figure 2:
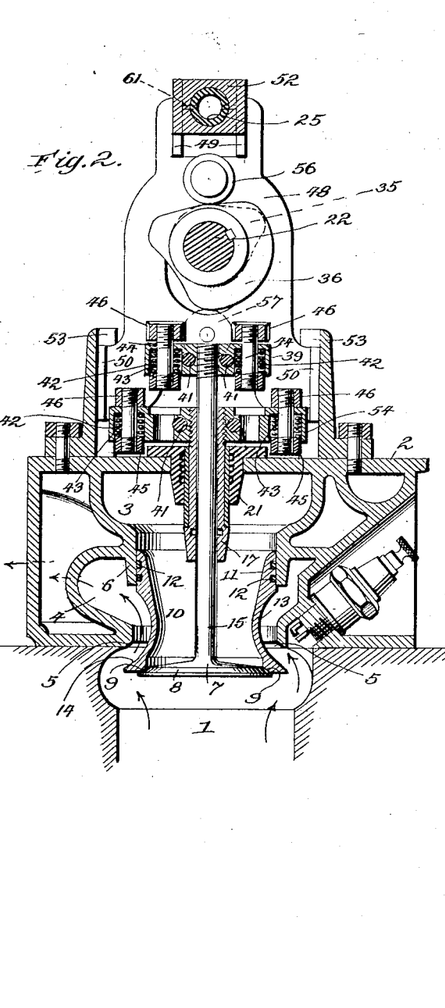
Fig. 2, a vertical transverse section on the line 2—2 of Fig. 1.
Figure 3:
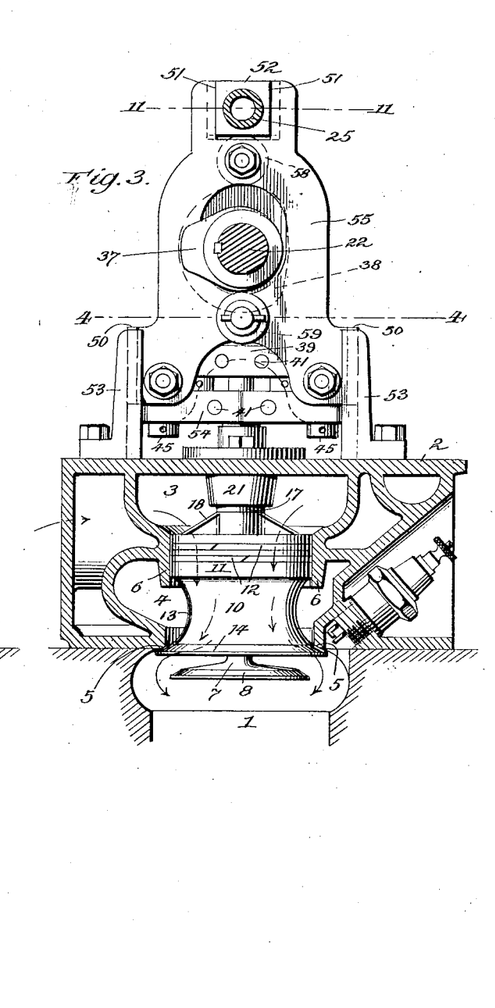
Fig. 3, a similar view on the line 3—3 of Fig. 1.
Figure 4:
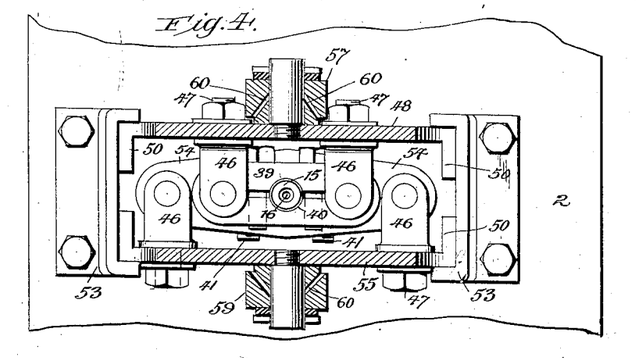
Fig. 4, a horizontal section taken on the line 4—4 of Fig. 3.

Referring first to Figs. 1, 2 and 3, 1 indicates the cylinder casting of an internal combustion engine, which may comprise any desired number of cylinders, two being illustrated. These may be formed in one integral casting or in separate units, suitably connected, as preferred. 2 indicates the cylinder head casting, here represented as one integral casting common to the several cylinders, and having formed in it the inlet passages 3, exhaust passages 4, exhaust valve seats 5 and exhaust valve guide rings or cylinders 6.

The inlet valves 7 are of circular disk form, each with a beveled circumferential face 8 which finds a corresponding seat 9 in the lower end of an annular exhaust valve 10. Each exhaust valve 10 is of the form shown in Figs. 1, 2, 3 and 10, having an annular body the upper portion 11 of which is of true cylindrical form to fit the guide ring or cylinder 6, said cylindrical portion 11 being advisably provided with split packing rings 12, such as are commonly used with engine pistons. Below the cylindrical portion 11 is a concave or hour-glass shaped portion 13, having just above its lower edge a beveled face 14 to match the valve-seat 5. The large cylindrical guiding surfaces thus provided insure great steadiness and accuracy of travel of the exhaust valves, with but little wear, while the packing rings compensate for such wear as does occur, and maintain a gas-tight barrier between the inlet and exhaust passages 3 and 4.

Each inlet valve 7 has a stem 15, preferably integral with its disk, and solid except for a longitudinal oil passage 16 extending from its end to about its midlength, and opening thence to the circumference of the stem. Each exhaust valve 10 is provided with a tubular stem 17 connected with the annular body of the valve by radial arms forming a spider 18, between the arms of which spider the gas charge may pass into and thence through the interior of the valve. The tubular stem 17 is bored to fit accurately about stem 15 of the inlet valve with a sliding fit, the contacting surfaces being constantly and thoroughly lubricated by oil supplied through the oil passage 16 of the inlet valve 7.

Figure 10:
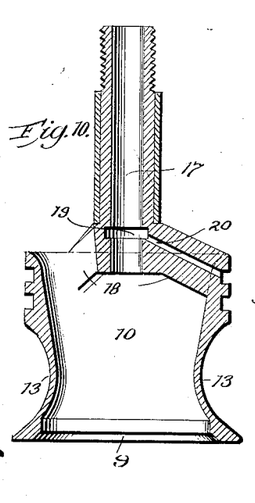
Fig. 10, a sectional elevation of the exhaust valve.
Figure 11:
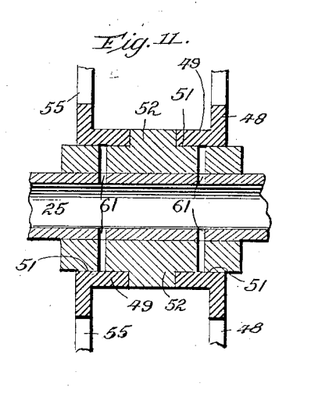
Fig. 11, a section taken on the line 11—11 of Fig. 3, through one of the guide blocks for the valve slides or carriers.

To insure like efficient lubrication of the contacting surfaces of the portion 11 of the exhaust valve and the guiding ring or cylinder 6, an annular groove or channel 19 is formed in the interior of stem 17 of said exhaust valve, in which collects the oil passing down between the concentric valve stems, and from which it flows to said contacting surfaces through passages 20 formed in the arms of spider 18, as seen in Figs. 1 and 10.

Each exhaust valve stem passes through a close fitting collar or gland 21, secured in place in an opening in the top of casting 2, and preferably annularly grooved internally to hold tallow, oil or other lubricating and packing material. This guidance, additional to that afforded by the cylindrical body 11 and guide ring or cylinder 6, insures a perfect right-line movement of the exhaust valve, the long tubular stem 17 of which in turn gives like guidance to the inlet valve stem 15 and valve 7. In this way is solved what has heretofore proven a difficult problem in the use of concentric valves seating one upon the other, that is, securing proper support and guidance of the valves throughout their movements, without in any manner hampering efficient driving connection with the valves.

The mechanism for operating the valves in proper time and sequence is illustrated in Figs. 1 to 8 inclusive, the first four figures showing the parts assembled. As it is usual practice to provide internal combustion engines with cylinders in even numbers, as two, four, six and upward, I have designed and here illustrate the supporting and guiding parts as made up in unit sections, each suitable for two cylinders, and I indicate the manner in which successive units may be added as required.

To support the cam-shaft 22 I provide hollow standards or uprights 23, formed with suitable bases to rest upon the top of casting 2, and to receive bolts or other fastening means for securing them rigidly to said casting. Each standard 23 is formed with a tubular head or boss 24 at its upper end to receive a tubular tie or connecting member 25, of diameter to fit accurately the eyes or openings of the bosses 24 in which the tie-member is secured by pins 26 passing through the bosses and said member. The tie-member 25 is shown in sections each of a length to span two cylinder heads, and the standards 23 are spaced to correspond.

Each standard 23 is formed with a circular enlargement 27 somewhat above its midheight, to receive a sleeve 28 which constitutes a bearing for cam-shaft 22. These sleeves are each formed with a circular portion to fit closely within an opening in and concentric with the enlargement 27, and with a radial flange or disk 29 which lies close against the face of such enlargement and is made fast thereto by tap bolts 30, or equivalent means. In that part within the hollow standard the sleeve is provided with an oil hole or passage 31, the upper end of which is enlarged into a concavity 32 reaching to the sides or walls of the interior space of the standard above the sleeve 28, which space serves as an oil chamber, and receives oil from the tubular connecting member 25 through an oil passage 33.

Oil under pressure is supplied to the connecting member 25 in any convenient manner, the ends of said member being plugged to prevent escape at those points, and the filling opening being sealed in any convenient or usual way. Directly beneath the oil passage 31 there is formed within and at the upper side of sleeve 28, a groove or channel 34 by which oil is distributed over the cam-shaft 22 throughout practically the full length of the sleeve. By the provisions thus made the cam-shaft is efficiently lubricated, and a sufficient quantity of oil is stored to maintain lubrication of the shaft and other parts presently noted, for a considerable length of time, while by utilizing the hollow frame for this purpose, lightness and strength of structure are secured, and other or special oil containers are rendered unnecessary.

Between the standards 23 and their sleeves 28 are arranged the cams which give motion to the valves, the cross-heads and slides through which connection is made and motion imparted, and the guideways in which the slides move. 35 and 36 indicate the cams which respectively open and close the inlet valve 7, and 37 and 38 indicate the cams which respectively open and close the exhaust valve 10, it being noted, however, that the exhaust valve during its opening movement carries with it the inlet valve, their simultaneous movement being necessary in order to maintain the inlet valve in contact with its seat during movement of the exhaust valve.

Figures 5, 6, 7, 8:
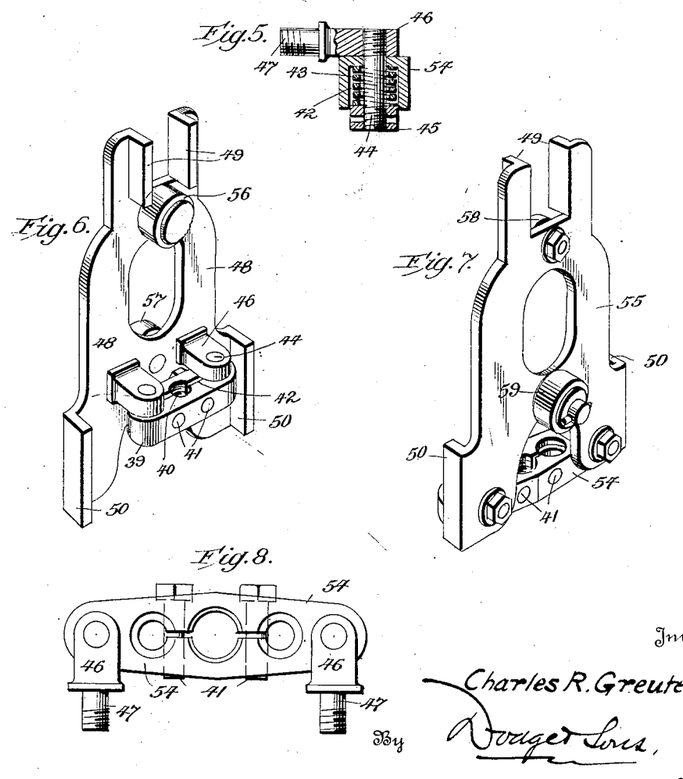
Fig. 5, a sectional view of one of the brackets or supports of the cross-heads which carry the valve stems.
Fig. 6, a perspective view of the slide or carrier and cross-head of the inlet valve.
Fig. 7, a similar view of the slide or carrier and cross-head of the exhaust valve.
Fig. 8, a plan view of the exhaust valve cross-head.
Figure 9:
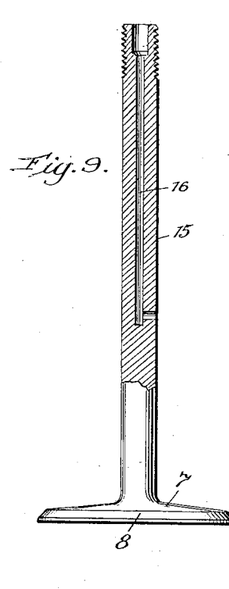
Fig. 9, an elevation of the inlet valve with its stem partly in section to show the oil passage.

Inlet valve 7 has secured to the upper end of its stem 15 a cross-head 39, having a tapped or threaded hole 40 at its midlength to receive the correspondingly threaded end of the valve stem. The cross-head is slotted from said hole toward the ends thereof. At either side of the tapped hole 40 is a transverse bolt 41, by which bolts the walls of the slot 42 may be drawn toward each other so as to grip the valve stem and thus to preclude any loosening or unscrewing of the valve stem. This is highly important in an engine for aviation purposes, owing to impracticability of making repairs or adjustments while in flights. Each end of the cross-head 39 is provided with a cavity open at is lower end, to receive a tempered helical spring 43, preferably of wire of rectangular cross section, and advisably of considerable stiffness. Concentric with this cavity or spring seat is a smaller opening extending therefrom to the upper face of the cross-head 39, through which hole passes the upper end of a cylindrical stem or bolt 44, which is threaded at both ends. A nut 45 is screwed upon the lower end of the stem or bolt 44, and serves to confine, and if need be, to compress more or less the spring 43. These parts are seen in Figs. 2 and 5.

The stem or bolt 44 passes freely through the cross-head 39, and is screwed into a stud or bracket 46 having a threaded stem 47, which screws into a suitably tapped hole in a slide or carrier 48, there being a separate bracket, stem, spring and nut for each end of the cross-head. The slide or carrier 48 has at its upper end two guiding members 49, and at its lower end two similar guiding members 50, all lying in parallel planes. The guide members 49 move in guideways 51, formed in blocks 52 carried by the tubular tie-member 25 of the valve gear framing, and the guide members 50 move in guideways in housings 53 bolted to the top of cylinder head casting 2, the several guides and guideways insuring accurate positioning and true right-line movement of the slide, and consequently of the valve carried thereby.

In similar manner, the tubular stem 17 of exhaust valve 10 is threaded at its upper end and screwed into a tapped hole in a cross-head 54 slotted longitudinally and furnished with compressing bolts and spring sockets in all respects the same as in the case of the inlet valve, except that the cross-head is longer and heavier. So, too, the cross-head 54 is furnished with spring seats, springs, bolts or stems, and carrying brackets in all respects like those of cross-head 39, the studs or brackets screwing into a slide or carrier 55 substantially identical with slide or carrier 48.

Inlet valve slide 48 is provided on one face near its upper end with a roller 56, and on the opposite face and near its lower end with a roller 57, each carried by a stud axle. Similarly, side 55 is provided on one face near its upper end with a roller 58, and on the opposite face near its lower end with a roller 59, which rollers are likewise carried by stud axles. When the parts are assembled, roller 56 of slide 48 overhangs cam 36, while roller 57 of said slide stands beneath cam 35. In like manner roller 58 of slide 55 overhangs cam 38, and roller 59 stands beneath cam 37.

The several rollers 56, 57, 58 and 59 are each drilled from a point at or near its periphery to a point at or about the midlength of its eye, to form an oil passage 60, as seen in Fig. 1. Owing to the rapid movement of the parts when the engine is in operation, oil supplied through the several outlet passages above described, will be thrown over various moving parts and will find its way to the roller axes, the lower guideways of the cam slides or carriers, and to the cylindrical upper ends of the exhaust valve and the packing rings thereof, loss of oil being prevented by a suitable cover or casing. Oil passages 61 also connect the upper guideways 51 with the interior of the tie-members 25, thus insuring a supply of oil to said guideways and the guiding members moving therein. Such an oiling system has been found to work very satisfactorily in practice, and this or some equivalent is absolutely essential to the successful operation of valves of the type here shown.

Figure 12:
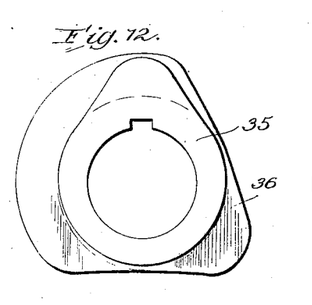
Fig. 12, a side or face view of the inlet valve cams.
Figure 13:
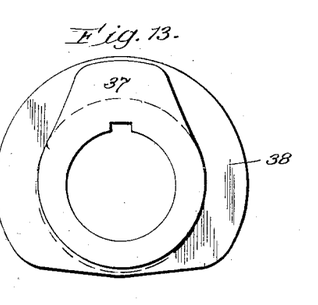
Fig. 13, a similar view of the exhaust valve cams.

The contours or outlines of the several cams are shown in Figs. 12 and 13, said cams being so formed and set in such angular relation one to another about shaft 22, that they produce the following movements of the inlet and exhaust valves in the order or sequence stated, it being understood that the cam-shaft 22 makes two revolutions to one one revolution of the crank-shaft, as is usual in four cycle engines.

During the first half-revolution or thereabout of cam-shaft 22, the inlet valve 7 is first opened through the action of cam 35 bearing upon roller 57, and then closed through the action of cam 36 bearing beneath roller 56, the exhaust valve remaining at rest on its seat. This occurs during the first outward stroke of the piston, which consequently draws in a charge of gas and air through the inlet valve opening. During the first in-stroke or return movement of the piston, which serves to compress the charge drawn in, the valves both remain closed or seated, those portions of the several cams in contact with the respective rollers 56, 57, 58 and 59 during this period being concentric with the shaft 22. During the next outward movement of the piston, which is the power stroke and at the commencement of which the charge is ignited, the valves still remain seated or closed, but at the commencement of the fourth stroke or second inward movement of the piston, which serves to scavenge the cylinder or force out the spent gases, the exhaust valve 10 is forced down by the cam 37 bearing upon the roller 59, and as said exhaust valve rests directly upon the upper face of the inlet valve 7, said inlet valve is carried down with the exhaust valve, remaining closely seated on said exhaust valve.

During the descent of the exhaust and inlet valves the cam 35 does not contact with the roller 57, nor until the exhaust valve 10 has been raised to its seat by the action of cam 38 bearing beneath roller 58, but at the time that cam 38 is bearing against roller 58 and elevating slide 55 and said exhaust valve, a like surface of cam 36 bears against and lifts roller 56 and consequently slide 48 and inlet valve 7, thus maintaining valve 7 on its seat 9 at the lower end of the exhaust valve during the closing movement of the latter.

To the end that each valve, 7 and 10, may always find a perfect seating, and to guard against any relative displacement of the valves at those periods in which the one should seat upon the other, the springs 43 interposed between the cross-heads of the valves and their connection with the slides 48 and 55, are provided. The springs of the respective cross-heads 39 and 54 tend always to lift said cross-heads relatively to their slides 48 and 55, and in the event that either valve should reach its seat before the upward travel of its carrying slide is completed, the springs will yield to the very limited extent which could in any case be necessary to permit the further travel of the slide after the seating of its valve. Similarly, on the downward or opening movement of the exhaust valve, carrying with it the inlet valve, the springs 43 of inlet valve cross-head 39 will hold the inlet valve to its seat on the exhaust valve notwithstanding a slight difference in the form or throw of the portions of cams 36 and 38 at such time lying beneath the rollers 56 and 58.

To insure this slight spring action, the smaller circular portion of each of the cams 35 and 37 is cut away very slightly, say one or two thousandths of an inch, so that during the seating periods of the valves said cams 35 and 37 are not actually in contact with the rollers 57 and 59 upon which they respectively act. The lower face of cam 36 differs from the lower face of cam 38 when said cams are viewed in the position indicated in Figs. 12 and 13, in that the former is slightly concave and the latter slightly convex. The dotted partial circles in Figs. 12 and 13 show the full or normal cam-surface, while the full-line partial circles show the cams cut away as explained.

It is desirable to make those portions of cams 35 and 37, between the smaller circular or hub portions and their crests, slightly concave instead of tangential to said hub portions. This produces a constant acceleration of the valve movements with smoother running, at the same time prolonging the actual period of opening of the valve, owing to the relatively slow movement of the valve at the commencement of the opening movement and toward the end of the closing movement.

The compression of springs 43 is regulated and fixed by adjusting the nuts 45 on the stems 44 until the springs are brought within (say) one-sixteenth of an inch of complete closing of the springs, coil upon coil. This will permit the springs to give or yield to the extent of $\frac{1}{32}$ of an inch when the valve comes up against its seat, and so make a perfect seating by compressing the springs, still leaving a small margin of safety before complete compression of the springs,—$\frac{1}{32}$ of an inch. This arrangement, as above indicated, is necessary to prevent excess movement of the valve under very high speeds, since owing to the weight of the valve and connected parts, the tendency would be to compress the springs completely, causing them at once to snap or spring back during the closing of the valve. Such action would cause a hammering with consequent wear and noise. The brackets 46 on one side and nuts 45 on the other, determine the limits of play of the cross-heads 39 and 54 and consequently of the valves 7 and 10, relatively to the slides 48 and 55.

The manner of setting the cams 36 and 38 is simple and is the same for each. The cam-shaft 22 is rotated until the cam reaches its highest position whereupon, the bolts 41 being loosened, the valve stem is screwed into its cross-head until the valve bears upon its seat, and sufficiently farther to compress the springs 43 the predetermined distance,—$\frac{1}{32}$ of an inch under the setting proposed. This adjustment can readily be determined by noting or measuring the amount of clearance between the brackets 46 and the cross-head 39 or 54, as the case may be. When such adjustment is made, the bolts 41 are tightened to clamp and hold the valve stem against rotation. The valves so set will continue to function properly for an indefinite period, or at least until a wearing of the valve and seat to the extent of $\frac{1}{32}$ of an inch. It is particularly to be noted that with this construction the valve can readily be removed or replaced without in any manner changing or removing the cam, shaft, or valve slide or yoke. The slight concavity of the previously straight tangential faces of the cams 35 and 37 is found to lessen materially the tendency to hammer or chatter at very high speeds, and to contribute to the efficiency of the engine.

As above intimated, various of the minor details are subject to modification. Thus the rollers 56, 57, 58 and 59 may be omitted, and rigid studs employed for the cams to act against. So, too, the inlet valve may be made to close against the same seat as does the exhaust valve, when both are seated. In other words, to seat both against the exhaust valve and against the exhaust valve seat, such arrangement being well-known in the art. I prefer, however, the construction illustrated as it insures the effectual sealing of the inlet passage, and does not involve the greater difficulty of making the inlet valve simultaneously rest upon two seats formed in bodies capable of relative movement.

It will be observed that cams 36 and 38 which seat the valves 7 and 10, are of identical or substantially identical contour through those portions which act upon the respective slides during the time that the inlet valve is seated upon the exhaust valve, including the opening and closing period of the exhaust valve.

The special means of or provision for lubrication illustrated and described herein are not specifically claimed in the present application owing to official requirement of division, lubricating means having acquired a distinct status in the arts and being hence proper to be presented in a separate application.

Having thus described my invention what I claim is:—

1. In combination with a valve seat, two concentric valves, one of annular form to close against said seat and provided with a seat for the second valve, and the other of disk form to seat thereon; and means for positively seating and unseating said valves.

2. In combination with a cylinder head having a valve seat; an annular valve arranged to seat thereon; a circular valve arranged to seat upon the open annular end of the first valve; and means for positively seating and unseating said valves in proper time and sequence.

3. In combination with an engine having inlet and exhaust passages; a valve seat at the point where the exhaust passage communicates with the engine cylinder; an annular cylinder or ring opening from one to the other passage; an annular exhaust valve comprising a cylindrical portion fitting and movable within the connecting cylinder or ring, and a peripherally concave second portion the annular edge of which is fashioned to rest upon the valve seat and close the port at the mouth of the exhaust passage; an inlet valve of disk form concentric with the annular valve and arranged to seat against the open end thereof; and means for positively moving said valves jointly and independently toward and from their respective seats.

4. In combination with a valve seat, an annular valve arranged to seat thereon and itself provided with a seat for a disk valve; a disk valve arranged to close against the seat upon the annular valve; means for positively moving the disk valve from its seat on the annular valve to open a passageway through the annular valve and for positively returning the disk valve to its seat; and means for positively moving the annular valve from and restoring it to its seat.

5. In combination with an annular valve and a disk valve concentric with and arranged to seat upon and close the annular valve; a carrier for the annular valve provided with oppositely projecting studs; a carrier for the disk valve likewise provided with oppositely projecting studs; and cams, one for each of said studs, and serving to move the valves to and from their seats positively and in proper time and sequence.

6. In combination with a cylinder head having an inlet passage, an exhaust passage, a valve seat, and connecting cylinder; an annular exhaust valve having a cylindrical portion to fit said connecting cylinder and a concave portion terminating in a bearing face; a tubular stem carrying said valve; a cross-head secured to said tubular stem; a slide and yielding connections between the slide and the cross-head; an inlet valve of disk form, seating against the open end of the exhaust valve; a cross-head carried by the stem of said exhaust valve; a slide and yielding connections between the cross-head and the slide; guideways for the respective slides; studs projecting from opposite faces of each slide; and cams carried by a rotary shaft intermediate the upper and lower stud of each slide, and serving positively to move the respective slides in both directions and thus to seat and unseat the valves in proper time and sequence.

7. In combination with two concentric valves, one of annular form and the other of disk form arranged to seat on the valve of annular form; concentric valve stems for the two valves; carrying slides for the respective valves; connections between the respective slides and the respective valve stems, permitting a limited relative movement of the slides and valves; and positively acting cams for moving the respective slides and valves positively in both directions and preventing overthrow of the valves.

8. In combination with inlet and exhaust valves having concentric stems one movable within the other; an oil passage formed within the inner stem and opening to the circumference thereof, and serving to deliver oil to the contacting surfaces of the two valve stems.

9. In combination with an annular valve having a tubular stem and a spider connecting the annular body and the stem; oil passages extending from the interior of the annular valve stem through the spider arms to the periphery of said valve; a disk valve arranged to seat against the open end of the annular valve, provided with a stem fitting and movable within the tubular stem of the annular valve, and having a longitudinal oil passage in its stem opening to the surface of said stem; whereby oil is delivered to the contacting surfaces of the two valve stems and to the surface of the annular valve.

10. In engine construction, a cam-shaft supporting frame, comprising a series of similar uprights or standards each provided with an enlargement having an opening to receive a bearing sleeve; bearing sleeves each having a portion of dimensions to fit accurately the opening of one of said standards, and provided with a disk; fastenings for securing said disk to the standard; and a connecting member extending from post to post, whereby the frame may be built up to any suitable length according to the number of cylinders employed.

11. In combination with a valve seat and an annular valve to seat thereon; a disk valve arranged to seat upon the annular valve; cams for positively moving said valves in seating and unseating directions; a carrier for each valve upon which the cams act; a yielding connection between the respective carriers and valves, including a stressed spring tending to draw the valve and the slide toward each other; and stops limiting the play of the spring, said connection serving to secure an elastic and sure seating of each valve, and to prevent injury through excessive travel of either carrier or through premature seating of either valve.

12. In combination with an annular valve and its seat, a disk valve concentric with and arranged to seat upon and to close the open end of said annular valve; cams for positively seating and positively unseating said valves, those portions of the seating cams which act upon the valves during the time both are seated and during the period through which the exhaust valve is unseated, being substantially identical in the two cams; whereby the inlet valve is enabled to maintain its seating on the annular valve both while said annular valve is seated and during its travel from and return to its seat.

13. In combination with an annular valve and its seat, a disk valve concentric with and arranged to seat upon and close the open end of said annular valve; cams for positively seating and positively unseating said valves; and yielding connections between the valves and their cam-actuated carriers, including for each a spring under compression, those portions of the valve-unseating cams which when the valves are seated directly face the surfaces against which said cams act, being slightly cut away to permit the springs to draw the valves firmly to and to hold them closely against their respective seats.

14. In combination with an engine cylinder having a valve seat, an annular valve movable to and from said seat; a disk valve movable both with and independently of said annular valve, and serving to seat upon and close the passage through said valve at proper times; independent carriers for said valves; yielding connections between said valves and their respective carriers; an opening-cam and a closing-cam for each valve carrier, located on opposite sides thereof and serving respectively to move said carriers and their valves inward and outward with reference to the cylinder, each inwardly-acting cam being slightly cut away on its smaller hub portion to prevent contact of such hub portion with the carrier lug on which it acts, at the moment that the outwardly-acting companion cam is at its maximum effective throw; whereby the cams and valve carriers are enabled to complete their full throw or travel after the seating of their respective valves.

In testimony whereof I have signed my name to this specification.

CHARLES R. GREUTER.